US010800910B2

(12) United States Patent
Gahleitner et al.

(10) Patent No.: US 10,800,910 B2
(45) Date of Patent: Oct. 13, 2020

(54) HIGH FLOW HETEROPHASIC POLYPROPYLENE COPOLYMERS WITH IMPROVED MECHANICAL AND OPTICAL PROPERTIES

(71) Applicant: BOREALIS AG, Vienna (AT)

(72) Inventors: Markus Gahleitner, Neuhofen/Krems (AT); Jingbo Wang, Engerwitzdorf (AT); Elisabeth Potter, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/344,617

(22) PCT Filed: Oct. 24, 2017

(86) PCT No.: PCT/EP2017/077124
§ 371 (c)(1),
(2) Date: Apr. 24, 2019

(87) PCT Pub. No.: WO2018/077854
PCT Pub. Date: May 3, 2018

(65) Prior Publication Data
US 2020/0181379 A1  Jun. 11, 2020

(30) Foreign Application Priority Data
Oct. 25, 2016  (EP) .................................... 16195586

(51) Int. Cl.
C08L 23/14    (2006.01)
C08L 23/12    (2006.01)
C08L 23/08    (2006.01)
B29C 45/00    (2006.01)

(52) U.S. Cl.
CPC .......... *C08L 23/14* (2013.01); *B29C 45/0001* (2013.01); *C08L 23/08* (2013.01); *C08L 23/12* (2013.01); *C08L 2205/03* (2013.01); *C08L 2207/02* (2013.01); *C08L 2314/02* (2013.01)

(58) Field of Classification Search
CPC .......... C08L 23/14; C08L 23/08; C08L 23/12; C08L 2205/03; C08L 2207/02; C08L 2314/02; B29C 45/0001
See application file for complete search history.

(56) References Cited

U.S. PATENT DOCUMENTS

2010/0272939 A1* 10/2010 Fiebig et al. ......... C08F 210/06
                                                  428/36.9
2015/0166776 A1*  6/2015 Kock et al. ........... C08F 291/18
                                                  524/151

FOREIGN PATENT DOCUMENTS

| EP | 0887379 A1 | 12/1998 |
|----|------------|---------|
| EP | 2431416 A1 | 3/2012 |
| EP | 2586823 A1 | 5/2013 |
| EP | 2610270 A1 | 7/2013 |
| EP | 2610271 A1 | 7/2013 |
| EP | 2610272 A1 | 7/2013 |
| EP | 2746295 A1 | 6/2014 |
| EP | 3015504 A1 | 5/2016 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2009019277 A1 | 2/2009 |
| WO | 2012007430 A1 | 1/2012 |
| WO | 2012045782 A1 | 4/2012 |
| WO | 2013079457 A1 | 6/2013 |
| WO | 2014094990 A2 | 6/2014 |
| WO | 2015024891 A1 | 2/2015 |
| WO | 2016066446 A1 | 5/2016 |

OTHER PUBLICATIONS

International Search Report and Written Opinion issued in PCT/EP2017/077124, dated Nov. 24, 2017.

* cited by examiner

*Primary Examiner* — Nathan M Nutter
(74) *Attorney, Agent, or Firm* — Meunier Carlin & Curfman LLC

(57) ABSTRACT

The present invention is directed to a new heterophasic polypropylene composition showing a good balance between stiffness and impact at low haze, as well as to its use for injection molded articles. The present invention is also directed to provide such heterophasic polypropylene composition in a more simplified mode of production.

18 Claims, No Drawings

HIGH FLOW HETEROPHASIC POLYPROPYLENE COPOLYMERS WITH IMPROVED MECHANICAL AND OPTICAL PROPERTIES

BACKGROUND INFORMATION

The present invention is directed to a new heterophasic polypropylene copolymer composition showing good balance between stiffness and impact at low haze, as well as to its use for injection molded articles and articles made from said composition.

The present invention is also directed to provide such heterophasic polypropylene composition in a simplified mode of production.

Heterophasic polypropylene copolymers are widely used in injection moulding processes. Such articles are very common in the packaging industry e.g. in thin wall packaging or injection stretch blow moulding (ISBM) application.

For such applications it is a continuous request by the industry to have products at hand that show better stiffness, better optical behaviour and better impact behaviour at the same time:

Polymers with higher stiffness can be converted into articles with lower wall thickness, allowing material and energy savings.

Polymers with good optical properties, especially low haze, are desired for consumer related articles to provide good "see-through" properties on the content of the packed goods.

Polymers with good impact behaviour are also desired in consumer related articles to safely keep the content even when dropped.

Good processability is required to ensure short production cycles or uniform filling of the moulds. This is especially important in the case of multi cavity tools, complex tool design, long flow path or high ratio of flow path to wall thickness, as e.g. given in thin walled articles.

The demands can be challenging, since many polymer properties are directly or indirectly interrelated, i.e. improving a specific property can only be accomplished at the expense of another property.

Stiffness can for instance be improved by increasing the crystallinity and/or the relative amount of homopolymer within the composition. As a consequence, the material becomes more brittle, thereby resulting in poor impact properties and/or worse optical properties.

Impact behaviour or optical properties can be improved by increasing the comonomer content. As a consequence the material will become softer and loose on stiffness. Thus impact or optical properties such as haze behave in a conflicting manner to stiffness.

Processability is linked with the viscosity or flowability of a polymer: especially for thin walled articles, complex tool design or fast production cycle a good flowability in the sense of a high MFR is essential.

At the same time it is well known, that polymers with high MFRs tend to become more brittle in the sense of low impact strength, especially at low temperatures.

DESCRIPTION OF THE PRIOR ART

WO2012/045782 describes a bimodal polypropylene random copolymer. The compositions achieve good stiffness, but the invention is not concerned with optical properties or improving the impact behavior.

WO2013079457A1 describes a polypropylene composition having a MFR2 in the range of 0.5 to 6.0 g/10 min, comprising, a propylene homopolymer, a random propylene copolymer, an elastomeric propylene copolymer, a polyethylene, and an α-nucleating agent, wherein the polypropylene composition is a heterophasic system in which the propylene homopolymer and the random propylene copolymer form the matrix of said system and the elastomeric propylene copolymer and the polyethylene are dispersed in said matrix. This composition achieves low haze values by adding significant amounts of LDPE, which at the same side clearly decreases tensile behavior. Furthermore the compositions disclosed have rather low MFRs and are hence not suitable for producing thin walled article with long flow-paths or complex tool-design.

WO2014094990 describes a heterophasic polypropylene resin with an MFR above 27 g/10 min and a good balance of high flowability, impact properties and low haze. This property profile is achieved by producing a heterophasic copolymer with a propylene homo- or copolymer matrix and a cross bimodal ethylene-propylene copolymer of low intrinsic viscosity.

Although the impact behaviour at low temperatures is good, both the reported haze values on 1 mm plaques and the reported tensile properties are not satisfying.

WO2009019277 describes heterophasic polypropylene compositions for soft and tough films. These products comprise a rather high amount of ethylene-propylene rubber fraction and have very low modulus.

EP2431416A1 discloses a heterophasic polypropylene system showing good balance between stiffness and impact at low haze. The composition comprises a crystalline polypropylene matrix and requires the presence of two different polyethylene fractions to adjust the transparency by adapting the refractive indices of the matrix and the dispersed phase. Still, both tensile properties and optical properties are lower than aimed for in the present invention.

It is obvious for the person skilled, that processability, tensile behaviour, and impact or optical behaviour are closely interrelated, i.e. improving a specific property can only be accomplished on the expense of another property.

However, with current technology it is difficult to get a good combination of all of the properties at the same time. For examples, in the current industrial production, normally copolymers made from propylene and ethylene monomer units are used when good optical properties and impact strength are desired, however, they are known for reduced stiffness: the higher the ethylene content, the lower the stiffness, the better the toughness and transparency.

In order to get a good combination of stiffness and toughness, heterophasic copolymers comprise a base resin which is a propylene homopolymer or a random copolymer of propylene and ethylene and comprise as a second component an elastomeric copolymer comprising at least two comonomers selected from ethylene and alpha-olefins, the so called rubber, often an ethylene-propylene rubber, EPR.

Such compositions are often addressed as heterophasic copolymers of polypropylene (having a homopolymer as base resin and a amorphous rubber phase dispersed therein) or random heterophasic copolymers of polypropylene (having a polypropylene-ethylene random copolymer as base resin with an amorphous rubber phase dispersed therein).

Heterophasic copolymers (HECOs) indeed give excellent stiffness/impact balance but the transparency is poor This is due to the factor that the rubber phase has different refractive index than the surrounding matrix and/or forms relatively big spheres. In both cases the transmitted light is scattered, the final articles become opaque.

It is also well known, that ethylene-propylene-rubber (EPR) directly contributes to improve impact behaviour of a heterophasic system: the impact resistance is influenced by the amount and size of the EPR particles. The larger the amount of EPR particles is, the higher is the impact resistance. Still further, the optimum size of the EPR particles is dependent on temperature, test speed and stress field. For a high impact resistance it is advantageous to have a high amount of small EPR particles.

It is further known, that the impact resistance of a heterophasic propylene copolymer having a matrix copolymer of propylene and ethylene is improved as compared to a heterophasic propylene copolymer having a matrix propylene homopolymer. The impact resistance increases with increasing comonomer content, e.g. ethylene content, likewise stiffness will decrease.

The optical properties of heterophasic systems are also known to be dependent on the EPR particles and on the content of comonomer in the matrix resin.

Generally, for achieving high transparency in two-phasic systems it is necessary to design a system where no scattering of light occurs at the phase boundaries. This can be achieved by proper selection of the refractive index of the two phases and/or by providing a dispersed phase which has a particle size below the wavelength of visible light, i.e. below about 400 nm.

Therefore, for providing a heterophasic composition with good stiffness high impact resistance and high transparency it is necessary to have a high amount of small particles as the dispersed phase and a high content of comonomer, particularly ethylene, in the matrix resin.

One way to get transparency is to adapt the refractive indices from the matrix and that of the dispersed phase by PE-addition (LDPE or LLDPE). This proceeding can lead to very complex recipes and poses a limitation on stiffness in the sense of low tensile strength or low tensile modulus.

Good miscibility and/or dispersability of the EPR particles within the matrix system is essential to ensure small rubber particles and hence good optical properties in the sense of low haze.

All heterophasic polypropylene compositions mentioned above are produced using a Ziegler-Natta catalyst, in particular a high yield Ziegler-Natta catalyst (so called fourth and fifth generation type to differentiate from low yield, also known as second generation Ziegler-Natta catalysts), which comprises a catalyst component, a co-catalyst component and an internal donor based on phthalate-compositions.

However, some of such phthalate-compositions are under suspicion of generating negative health and environmental effects and will probably be banned in the future. Furthermore, there is an increasing demand on the market for "phthalate-free polypropylene" suitable for various applications, e.g. in the field of packaging, food and medical applications.

WO 2016066446 A1 as well as EP 3015504 A1 both concern heterophasic polypropylene compositions based on a non-phthalate Ziegler-Natta catalyst with a citraconate ester as internal donor. The claimed compositions are however not suitable for highly transparent packaging applications.

OBJECT OF THE INVENTION

There is hence a strong need for improved materials which have good or improved stiffness, high impact resistance, good transparency and good flowability.

There is further a constant need in the industry to provide polymers which show good processability combined with good stiffness, good impact and good optical behaviour such as haze. Viewed from another aspect, it is desired to have polymers with a high ratio of stiffness/optical behaviour, like a high ratio of tensile modulus to haze.

Simultaneously it is a desire to reduce complexity of the recipe.

It is therefore the object of the present invention to provide such materials with improved mechanical properties like stiffness, impact and optical behaviour which can easier produced, particularly in view of the application of such materials for injection moulding, packaging purposes, especially for thin walled application or in the medical fields.

The invention is based on the surprising finding that the above mentioned object can be achieved by providing a heterophasic polypropylene composition comprising a matrix resin and an elastomeric resin as a dispersed phase, wherein the matrix resin comprises a polypropylene random copolymer (a) and a propylene homopolymer or a further polypropylene random copolymer (b), a disperse phase comprising an ethylene propylene rubber (c) and a nucleating agent.

Accordingly the present invention provides a heterophasic polypropylene composition characterised by an MFR230/2.16 according to ISO1133 of 10.0 g/10 min or more and comprising a) 80.0-96.0 wt.-% of a polypropylene random copolymer
b) 3.0-18.0 wt.-% of a polypropylene homopolymer or further polypropylene random copolymer,
c) 0.5-2.50 wt.-% of an elastomeric ethylene-propylene copolymer fraction characterised by an Intrinsic Viscosity (IV) of 0.7-2.0 dl/g and an ethylene content (C2 of (XCS)) of 12.0-35.0 wt.-%., and
d) 0.002-0.60 wt.-% of a clarifying agent.

In a further special embodiment the present invention envisages a heterophasic polypropylene composition characterised by very specific property profile in the sense of mechanical properties.

In still a further special embodiment the present invention envisages articles made out of the heterophasic polypropylene composition of the present invention.

In another further special embodiment the present invention envisages the use of such articles made out of the heterophasic polypropylene composition of the present invention, preferably in alimentary packaging, bottles closures or caps or thin wall packaging applications.

DETAILED DESCRIPTION

Heterophasic Polypropylene Composition

The heterophasic polypropylene composition of the present invention is characterised by comprising a) 80-96.0 wt.-% of a polypropylene random copolymer
b) 3.0-18.0 wt.-% of a polypropylene homopolymer or further polypropylene random copolymer,
c) 0.5-2.50 wt.-% of an elastomeric ethylene-propylene copolymer fraction, and
d) 0.002-0.60 wt.-% of a clarifying agent In a preferred embodiment, the heterophasic polypropylene composition of the present invention is essentially free of crystalline polyethylene with an enthalpy of larger than 0.1 J/g and a Tm of below of 135° C.

It is further preferred, that the polypropylene homopolymer or polypropylene random copolymer (b) and the elastomeric ethylene-propylene rubber fraction (c) are present in the heterophasic polypropylene composition of the present invention in ratios of 60:40 (b:c) to 90:10 (b:c), like 70:30 or 80:20 (b:c).

It is further preferred, the sum of the weight fractions of the polypropylene homopolymer or further polypropylene random copolymer (b) and the elastomeric ethylene-propylene copolymer fraction (c) together form at most 20.0 wt.-% based on the heterophasic polypropylene composition of the present invention up to 18.0, like up to 15.0 or 12.0 wt.-% or lower.

The fractions (b+c) may be present in at least 3.5 wt.-% based on the heterophasic polypropylene composition of the present invention, such as at least 4.5 wt.-%, at least 7.0 wt.-%, at least 9.0 wt.-% or at least 11.0 wt.-%.

Preferred ranges for the fractions (b+c) together can be 3.5-20.0 wt.-%, like 4.5-18.0 wt.-%, 7.0-17.0 wt.-% or 9.0-15.0 wt.-%.

Where the propylene random copolymer (a), the propylene homopolymer or further polypropylene random copolymer (b), or the ethylene-propylene rubber (c) comprise more than one fraction, these fractions may have a different average molecular weight, a different molecular weight distribution, or in case of the propylene copolymer and of the ethylene-propylene rubber, a different content of comonomer.

In case these fractions have different average molecular weight, different molecular weight distribution or different comonomer content, the fractions are regarded bi- or multimodal.

It is preferred that the polypropylene random copolymer (a) can be bimodal or multimodal in view of molecular weight distribution, or comonomer content or both.

It is preferred that the comonomer of the polypropylene random copolymer (a) or the further polypropylene random copolymer (b) is ethylene and/or a C4-C10 alpha-olefin like 1-butene, 1-pentene, 1-hexene, 1-heptene, 1-octene etc. or a mixture thereof. Especially preferred is that in the present invention the comonomer is ethylene.

It is further preferred, that the heterophasic polypropylene composition of the present invention comprises only ethylene as comonomer.

The ethylene content of the heterophasic polypropylene composition of the present invention can be in the range 2.0-10.0 wt.-%.

The heterophasic polypropylene composition of the present invention has an MFR230/2.16 according to IO1133 of ≥10.0 g/10 min, such as 12.0, 15.0, 18.0 or 20.0 g/10 min or higher.

The heterophasic polypropylene composition of the present invention may have an MFR of up to 100 g/10 min, like up to 80.0 g/10 min or below, such as up to 60.0 g/10, up to 45.0 g/10 min, up to 38.0 g/10 min, up to 33.0 or up to 29.0 g/10 min or below.

The heterophasic polypropylene composition of the present invention may have preferably an MFR230/2.16 in the range of 10.0-100.0 g/10 min, such as 12.0-60.0 g/10 min, 15.0-45 g/10 min; 18.0-33.0 g/10 min or 20.0-29.0 g/10 min.

The amount of fractions soluble in xylene (XCS) of the heterophasic polypropylene composition of the present invention can be in the range of 10.0 wt.-% or below, such as 9.0 wt.-% or below, or 7.0 wt.-% or below.

The amount of fractions soluble in xylene (XCS) of the heterophasic polypropylene composition of the present invention may be at least 2.0 wt.-%, such as at least 3.5 wt.-%, like 4.5 wt.-% or higher.

The amount of fractions soluble in xylene (XCS) of the heterophasic polypropylene composition of the present invention may be in the ranges of 2.0-10.0 wt.-%, such as 3.5-9.0 wt.-% like 4.5-7.0 wt.-%.

The intrinsic viscosity (IV) of the XCS can be in the range 0.7-2.0 dl/g, such as 1.0-1.9 dl/g or 1.3-1.8 dl/g.

The ethylene content of fractions soluble in xylene (C2 of XCS) can be in the range of 10.0-35.0 wt.-%, like 14.0-33.0 wt.-%, such as 15.0-30.0 wt.-% or 20.0-27.0 wt.-%

It is similarly preferred that the heterophasic polypropylene composition of the present invention consists of
a) 80.0-96.0 wt.-% of a polypropylene random copolymer
b) 3.0-18.0 wt.-% of a polypropylene homopolymer or further polypropylene random copolymer,
c) 0.50-2.50 wt.-% of an elastomeric ethylene-propylene copolymer fraction characterised by an IV of 0.7-2.0 dl/g and an C2(XCS) of 12.0-35 wt.-%., and
d) 0.002-0.60 wt.-% of a clarifying agent.

It is envisaged within the invention that even if consisting of the components, the heterophasic polypropylene composition of the present invention can still contain the usual qualities and quantities of additives, stabilisers, lubricants, pigments, etc.

a) Polypropylene Random Copolymer,

The polypropylene random copolymer (a) may be present in the heterophasic polypropylene composition of the present invention with at least 80.0 wt.-% or 83.0 wt.-% or more, like 88.0 wt.-% or higher, 91.0 wt.-% or higher or 94.0 wt.-%, or higher.

The polypropylene random copolymer (a) can be present in the heterophasic polypropylene composition of the present invention with at most 96.0 wt.-% such as at most 94.0 wt.-%, like at most 93.0 wt.-%, at most 91.0 wt.-% or at most 90.0 wt.-%.

Preferred ranges for the polypropylene random copolymer (a) in the heterophasic polypropylene composition of the present invention are 80.0-96.0 or 83.0-93.0 wt.-%, such as 85.0-90.0 wt.-%

The comonomer content in the polypropylene random copolymer (a) can be at least 0.2 wt.-%, such as 0.8 or 1.2 or 1.5 wt.-% or higher.

Alternatively the comonomer content in the polypropylene random copolymer (a) can be up to 3.5 wt.-% or below, at most 3.3 wt.-% or lower, like at most 3.0 wt.-%.

The comonomer content in the polypropylene random copolymer (a) can be preferably in the ranges of 0.2-3.5 wt.-%, such as 0.8-3.3 wt.-%, or 1.2-3.0 wt.-%, such as 1.5-3.0 wt.-%. It is preferred that the comonomer of the polypropylene random copolymer (a) is ethylene and/or a C4-C10 alpha-olefin like 1-butene, 1-pentene, 1-hexene, 1-heptene, 1-octene etc. or a mixture thereof. Especially preferred is that in the present invention the comonomer is ethylene.

The polypropylene random copolymer (a) may differ from the polypropylene homopolymer or further polypropylene random copolymer (b).

The polypropylene random copolymer (a) may differ from the polypropylene homopolymer or further polypropylene random copolymer (b) in view of MFR or comonomer content or both. Preferably, the comonomer content in the polypropylene random copolymer (a) is higher than the comonomer content of the polypropylene homopolymer or further polypropylene random copolymer (b).

It is equally preferred, that the MFR of the polypropylene random copolymer (a) is higher than the comonomer content of the polypropylene homopolymer or further polypropylene random copolymer (b).

It is alternatively preferred, that both the comonomer content and the MFR of the polypropylene random copolymer (a) are higher than the MFR and comonomer content of the polypropylene homopolymer or further polypropylene random copolymer (b).

The amount of fractions soluble in cold xylene (XCS) of the polypropylene random copolymer (a) can be in the range of 10 wt.-% or below, such as 9.0 wt.-% or below, or 8.0 wt.-% or below. Alternatively, the amount of fractions soluble in cold xylene (XCS) of the polypropylene random copolymer (a) can be in the range of at least 1.5 wt.-% or higher, such as 2.0 wt.-%, 2.5 or 3.0 wt.-% or higher.

Preferred ranges for the fractions soluble in cold xylene (XCS) of the polypropylene random copolymer (a) 1.5-10 wt.-%, alternatively 2.0-9.0 wt.-% or 2.5-8.0 wt.-%.

The MFR of the polypropylene random copolymer (a) is at least 8.0 g/10 min or higher, such as 10.0 g/10 min or more such as 15.0 g/10 min or more, like 20.0 g/10 min or more.

The MFR of the polypropylene random copolymer (a) can be up to 100 g/10 or below, such as up to 80.0 g/10 min, like up to 60.0 g/10 min, up to 45. g/10 min, up to 35.0 g/10 min, up to 30.0 g/10 min, like 28.0 g/10 min or below.

Preferred MFR ranges of the polypropylene random copolymer (a) can be 8.0-100.0 g/10 min, such as 10.0-60.0 g/10 min, 15.0-45.0 g/10 min or 20.0-30.0 g/10 min.

Preferably the MFR of the polypropylene random copolymer (a) is at least the same or higher than the MFR of any of the other fractions present in the heterophasic polypropylene composition of the present invention.

Especially preferred is that the MFR of the polypropylene random copolymer (a) is higher than the MFR of any of the other fractions present in the heterophasic polypropylene composition of the present invention.

The viscosity of the polypropylene random copolymer (a) can be controlled in-reactor or post-reactor by degradation with any suitable substances, like peroxides.

The polypropylene random copolymer (a) may comprise or consist of a single polypropylene random copolymer fraction (=unimodal), but may also comprise a mixture of different polypropylene random copolymer fractions (=bi-modal or multimodal). Where the propylene random copolymer (a) comprises more than one fraction, these fractions may have a different average molecular weight, a different molecular weight distribution, or a different content of comonomer.

In case these fractions have different average molecular weight, different molecular weight distribution or different comonomer content, the copolymer is regarded bi- or multimodal.

It is preferred that the polypropylene random copolymer (a) can be bimodal or multimodal in view of molecular weight distribution, or comonomer content or both.

Suitable peroxides can be:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 2,5-dimethyl-2,5-di-(tert-butylperoxy) hexane, 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy) cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-13-t-butyl perthalate, di-t-butyl persebacate, 4-nitrocumyl perpropionate, 1-phenylethylperbenzoate, phenylethyl nitro-perbenzoate, t-butylbicyclo-(2,2,1)heptane percarboxylate, tbutyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate, or mixtures of these above listed free radical-forming agents.

In a preferred embodiment, the peroxide (PO) is an alkyl peroxide. It is especially preferred that the peroxide (PO) is 2,5-dimethyl-2,5-di-(tert-butylperoxy)hexane.

b) Polypropylene Homopolymer or Further Polypropylene Random Copolymer

The polypropylene homopolymer or further polypropylene random copolymer (b) is present in the heterophasic polypropylene composition of the present invention with at most 18.0 wt.-% or lower, such as at most 17.0 wt.-%, 15.0 wt.-% or below, or at most 13.0 wt.-%, like 10.0 wt.-% or below, at most 7.5 wt.-% or 5.0 wt.-% or below.

The polypropylene homopolymer or further polypropylene random copolymer (b) may be present in amounts of at least 3.0 wt.-% or higher, such as 4.0 wt.-% or 4.5 wt.-% or higher. Alternatively preferred ranges for the polypropylene homopolymer or further polypropylene random copolymer (b) are within 3.0-18 wt.-%, such as 4.0-15.0 wt.-% like 4.5-13.0 wt.-%.

Preferably the polypropylene homopolymer or further polypropylene random copolymer (b) is a homopolymer.

Alternatively preferred is that the polymer corresponding to fraction (b) is a polypropylene random copolymer and different to polypropylene random copolymer (a).

The polypropylene random copolymer (b) is different to the polypropylene random copolymer (a) and may differ from polypropylene random copolymer (a) in the MFR, the comonomer content, additivation or any combinations thereof.

The MFR of the polypropylene homopolymer or a further polypropylene random copolymer (b) is not higher than the MFR of the polypropylene random copolymer (a), preferably lower than the MFR of the polypropylene random copolymer (a).

The MFR of the polypropylene homopolymer or a further polypropylene random copolymer (b) may be at least 1.0 g/10 min or above, such as at least 1.5 g/10 min, at least 2.0 g/10 min, at least 2.5 g/10 min or higher.

The MFR of the polypropylene homopolymer or a further polypropylene random copolymer (b) can be alternatively up to 8.0 g/10 min or below, such as up to 7.0 g/10 min, up to 6.0 g/10 min or up to 5.0 g/10 min or lower.

Preferred MFR ranges of the polypropylene homopolymer or a further polypropylene random copolymer (b) can be 1.0-8.0 g/10 min, such as 2.0-7.0 g/10 min, 2.5-5.0 g/10 min.

It is preferred that MFR or the comonomer content of polypropylene homopolymer or further polypropylene random copolymer (b) is lower than in the polypropylene random copolymer (a).

It is especially preferred that both the MFR and the comonomer content of the polypropylene homopolymer or further polypropylene random copolymer (b) are lower than in the polypropylene random copolymer (a).

In a preferred embodiment the polypropylene homopolymer or polypropylene random copolymer (b) and the elastomeric ethylene-propylene rubber fraction (c) are present in the heterophasic polypropylene composition of the present invention in ratios of 60:40 (b:c) to 90:10 (b:c); 70:30 or 80:20 (b:c).

It is alternatively preferred, that a composition of the polypropylene homopolymer or polypropylene random copolymer (b) and the elastomeric ethylene-propylene rubber fraction (c) is further characterised by Flexural Modulus in the range of 1200-1400 MPa and a Charpy notched impact strength NIS+23° C. in the range of 30.0-80.0 $kJ/m^2$.

In case fraction (b) is a polypropylene random copolymer, the comonomer content in the polypropylene random copolymer (a) can be up to 1.0 wt.-% or below, such as 0.8 wt.-% or lower, or 0.5 wt.-% or below.

Alternatively the comonomer content of the polypropylene homopolymer or further polypropylene random copolymer (b) can be at least 0.1 wt.-%, such as 0.2 wt.-% or more, like 0.3 wt.-% or more.

Preferably the comonomer content of the polypropylene homopolymer or further polypropylene random copolymer (b) can be in the range of 0.1-1.0, wt.-%, such as 0.2-0.8 wt.-% such as 0.3-0.5 wt.-%.

The amounts of fraction soluble in cold xylene (XCS) of the polypropylene homopolymer or further polypropylene random copolymer (b) can be in the range of 1.0-5.0 wt.-%, like 1.2-4.0 wt.-%, like 1.5-4.0 wt.-%, such as 1.5-3.5 wt.-%.

The polypropylene homopolymer or further polypropylene random copolymer (b) is especially suitable to comprise further nucleating agents, preferably polymeric nucleating agents and can serve as a nucleating masterbatch in the sense of the masterbatch nucleating technology.

c) Ethylene-Propylene Rubber Phase

The term "ethylene-propylene rubber phase" denotes the material which is essentially dispersed in the matrix and is soluble in p-xylene under the conditions described as XCS.

In a preferred embodiment the ethylene-propylene rubber phase is present in the heterophasic polypropylene composition of the present invention in ranges of 0.5-2.5 wt.-%, like 0.7-2.0, such as 1.1-1.8 wt.-%

The ethylene-propylene rubber phase is preferably composed of ethylene monomer units in an amount of at most 35.0 wt.-%. Even more preferably, the XCS-fraction is composed of ethylene monomer units in an amount of 12.0 to 35.0 wt.-%, like 14.0-33.0 wt.-%, such as 15.0-30.0 wt.-%. Most preferably the XCS-fraction is composed of ethylene monomer units in an amount of 20.0 to 27.0 wt.-%.

The ethylene-propylene rubber phase is characterised by an intrinsic viscosity IV in the range of 0.7-2.0 dl/g, preferably 1.0-1.8 dl/g, like 1.3-1.8 dl/g.

Ethylene-propylene rubbers can either be synthesised in a latter step(s) of a multistage process, where in the first step(s) the random copolymer (a) and/or the propylene homo- or random copolymer (b) is synthesised or, alternatively, ethylene-propylene rubber can be polymerised separately and mixed with the random copolymer and the homopolymer component in a separate melt blending step.

It is preferred that the ethylene propylene rubber phase c) is polymerised in a latter step of a multistage process.

An ethylene propylene rubber may be produced by known polymerisation processes such as solution, suspension and gas-phase polymerisation using conventional catalysts. Ziegler Natta catalysts as well as metallocene catalysts are suitable catalysts.

Accordingly, for the production of a heterophasic propylene-ethylene copolymer or a heterophasic propylene-ethylene random copolymer it is preferred to use a multistage polymerisation process which utilizes, firstly, a reactor setup as outlined above, i.e. a polymerisation process based on a first polymerisation step in at least one slurry reactor and an optional second polymerisation step preferably comprising at least one gas phase reactor, for producing the polypropylene homopolymer or the random propylene copolymer, and, secondly, at least one additional polymerisation step(s) in one or more gas phase reactors.

In a preferred embodiment the polypropylene homopolymer or polypropylene random copolymer (b) and the elastomeric ethylene-propylene rubber fraction (c) are present in the heterophasic polypropylene composition of the present invention in ratios of 60:40; (b:c) to 90:10 (b:c), like 70:30 or 80:20 (b:c).

It is alternatively preferred, that a composition of the polypropylene homopolymer or polypropylene random copolymer (b) and the elastomeric ethylene-propylene rubber fraction (c) is further characterised by Flexural Modulus in the range of 1200-1400 MPa and a Charpy notched impact strength NIS+23° C. in the range of 30.0-80.0 $kJ/m^2$.

d) Nucleating or Clarifying Agent

The heterophasic polypropylene composition of the present invention comprises at least one nucleating or clarifying agent in amounts up 0.60 wt.-%, such at most 0.35 wt.-% or at most 0.30 wt.-% or 0.25 wt.-% or below Alternatively the heterophasic polypropylene composition of the present invention comprises at least 0.002 wt.-% of the nucleating or clarifying agent, such as at least 0.01 wt.-%, at least 0.05 wt.-% at least 0.10 wt.-% or at least 0.15 wt.-% or higher.

Preferred ranges for the nucleating or clarifying agent in the heterophasic polypropylene composition of the present invention are 0.002-0.60 wt.-%, such as 0.01 to 0.30 wt.-% or 0.10 to 0.25 wt.-%.

The nucleating or clarifying agent (d) is preferably soluble in the heterophasic polypropylene composition of the present invention.

The nucleating or clarifying agent (d) can be selected from the group of sorbitol, nonitol or trisamide based nucleating agents, such as:

di(alkylbenzylidene)sorbitols as 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol;

nonitol derivatives: e.g. 1,2,3-trideoxy-4,6;5,7-bis-O-[(4-propylphenyl)methylene] nonitol; and benzene-trisamides: like substituted 1,3,5-benzenetrisamides as N,N',N''-tris-tert-butyl-1,3,5-benzenetricarboxamide, N,N',N''-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide are equally preferred.

Further Nucleating Agents

The heterophasic polypropylene composition of the present invention may comprise further nucleation agents in addition to and different to the nucleating or clarifying agent according to (d).

It is envisaged that the heterophasic polypropylene composition of the present invention comprises at least two nucleating agents.

Such further nucleating agents and can be selected from the groups consisting of (i) salts of monocarboxylic acids and polycarboxylic acids, e.g. sodium benzoate or aluminum tert-butylbenzoate; or dicarboxylate salt compounds, e.g. bicyclic [2.2.1] heptane dicarboxylate salt, wherein bicyclic [2.2.1] heptane dicarboxylate salt is preferred.

(ii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and hydroxybis (2,4,8,10-tetra-tert-butyl-6-hydroxy-12Hdibenzo(d,g)(1,3,2) dioxaphosphocin 6-oxidato) aluminium, wherein hydroxybis (2,4,8,10-tetra-tert-butyl-6-hydroxy-12H-dibenzo(d,g)(1,3,2) dioxaphosphocin 6-oxidato) aluminium is preferred; and (iii) polymeric nucleating agents, such as polymerised vinyl compounds, in particular polymerised vinyl cycloalkanes, like vinyl cyclohexane (VCH), vinylcyclopentane, and vinyl-2-methyl cyclohexane, 3-methyl-1-butene, 3-ethyl-1-hexene, 3-methyl-1-pentene, 4-methyl-1-pentene or mixtures thereof. Poly(vinyl cyclohexane) (PVCH) is particularly preferred.

Preferred nucleating agents comprised by the heterophasic polypropylene composition of the present invention are select from groups (i), (ii) or (iii), especially preferred are: bicyclic [2.2.1] heptane dicarboxylate salt, sodium 2,2'-methylene bis-(4,6-di-tert. butylphenyl) phosphate or poly (vinyl cyclohexane) (PVCH).

The heterophasic polypropylene composition of the present invention may further comprise two additional nucleating agents selected from groups (i)+(ii), (i)+(iii) or (ii)+(iii).

Especially preferred combinations are selected from groups (i)+(iii), wherein a combination of bicyclic [2.2.1] heptane dicarboxylate salt, with poly(vinyl cyclohexane) (PVCH) is particularly preferred.

Polymeric nucleating agents from group (iii) can either be incorporated by in-reactor nucleation or by the so called Masterbatch technology (compounding technology) as mentioned below.

In a preferred embodiment of the present invention, the polymeric nucleating agent is introduced into the heterophasic polypropylene composition by means of a suitably modified catalyst, into the reactor (i.e. in-reactor nucleation) i.e. the catalyst to be used in catalysing the polymerisation of any of the fractions a) or b), is subjected to a polymerisation of a suitable monomer for the polymeric nucleating agent to produce said polymeric nucleating agent. The catalyst is then introduced together with the obtained polymeric nucleating agent to the polymerisation step of the polypropylene random copolymer (a) or polypropylene homopolymer or further polypropylene random copolymer (b) In a particularly preferred embodiment of the present invention, the propylene polymer is prepared in the presence of such a modified catalyst to obtain said reactor made heterophasic polypropylene composition. With such modified catalyst, it is also possible to carry out the above-identified preferred polymerisation sequence for the preparation of in-situ blended multimodal, including bimodal, polypropylenes.

Another embodiment, different to the above mentioned in-reactor blend, is a mechanical blend of a polymer with a nucleating agent, wherein the polymer is first produced in the absence of a polymeric nucleating agent and is then blended mechanically with the polymeric nucleating agent or with a small amount of nucleated polymer or with polymers, which already contain the polymeric nucleating agent (so-called master batch technology) in order to introduce the polymeric nucleating agent into the polymer mixture. The preparation of a reactor made polymer composition ensures the preparation of a homogenous mixture of the components, for example a homogenously distributed polymeric nucleating agent in the heterophasic polypropylene composition, even at high concentrations of polymer nucleating agent.

The masterbatch technology is preferred.

It is further preferred that either the polypropylene random copolymer (a) and/or the polypropylene homopolymer or further polypropylene random copolymer (b) contain the polymeric nucleating agent.

Especially preferred is that the polypropylene homopolymer or further polypropylene random copolymer (b) comprises the polymeric nucleating agents as is accordingly used as a nucleating masterbatch in the sense of the masterbatch technology as defined above.

The person skilled is aware that the heterophasic polypropylene composition of the present invention can also comprise further additives, like stabilisers or other adjuvants.

Typical additives are acid scavengers, antioxidants, colorants, light stabilisers, plasticisers, slip agents, anti-scratch agents, dispersing agents, processing aids, lubricants, pigments, and the like.

Furthermore, the term "additives" according to the present invention also includes carrier materials, in particular polymeric carrier materials.

It is understood within the scope of the invention, that such carrier materials or polymeric carrier materials are present, even in a composition defined as "consisting of (a)+(b)+(c)+(d)"

The heterophasic propylene compositions of the invention may be produced by separate polymerisation of each of its components and by melt blending the components and incorporating any additives or other adjuvants.

The heterophasic polypropylene composition of the present invention may also be produced in a sequential polymerisation process in any suitable order.

The heterophasic propylene compositions of the invention may further be produced by polymerising a heterophasic propylene copolymer comprising a propylene homo- or random copolymer (b) matrix and an ethylene-propylene rubber (c) and melt blending these with a separately polymerised propylene random copolymer (a) and any nucleating agents or further additives.

The heterophasic propylene compositions of the invention may further be produced by polymerising a heterophasic propylene random copolymer (also called RAHECO) comprising a propylene random copolymer (a) matrix and an ethylene-propylene rubber (c) and by melt blending the heterophasic propylene random copolymer with a separately polymerised propylene homo- or copolymer polymer (b).

Still further, the heterophasic propylene compositions of the invention may be produced by polymerising a heterophasic propylene random copolymer comprising a propylene random copolymer (a) matrix and an ethylene-propylene rubber (c) and by melt blending the heterophasic propylene random copolymer with a separately polymerised heterophasic propylene copolymer comprising a propylene homo- or random copolymer (b) and an ethylene-propylene rubber (c).

Preferably the polypropylene homopolymer or further polypropylene random copolymer (b) and the elastomeric ethylene-propylene rubber fraction (c) are premixed or polymerised in a sequential polymerisation process, before being blended with the polypropylene random copolymer (a).

Accordingly, for the production of a heterophasic propylene-ethylene copolymer (e.g. being fractions (b+c when b is a polypropylene homopolymer)) or a heterophasic propylene-ethylene random copolymer (being either fractions a+c or b+c, with b being a further polypropylene random copolymer) it is preferred to use a multistage polymerisation process which utilises, firstly, a reactor setup with a polymerisation process based on a first polymerisation step in at least one slurry reactor and an optional second polymerisation step preferably comprising at least one gas phase reactor, for producing the polypropylene homopolymer or further polypropylene random copolymer (b) and, secondly, at one or more additional polymerisation step(s) in one or more gas phase reactors.

A preferred reactor setup is a combination of bulk slurry loop reactor(s) and gas phase reactor(s), particularly one loop reactor and one gas phase reactor: (polypropylene homopolymer or polypropylene random copolymer (b) in loop and EPR in gas phase) or two loop reactors and one or two gas phase reactors (polypropylene homopolymer and random copolymer in loops and EPR in gas phases).

The polypropylene homopolymer or further polypropylene random copolymer (b) is transferred into a gas phase reactor, where EPR is produced. Afterwards the product is optionally transferred into a further gas phase reactor, where an optional further (or final) part of the EPR is produced.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

After the polymerisation is finished, the polymer product is recovered by conventional procedures. The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents.

Mechanical Properties:

The heterophasic polypropylene composition of the present invention is characterised by a explicitly well balanced property profile, both in view of stiffness, impact and optical behaviour.

The heterophasic polypropylene composition of the present invention has good stiffness in the sense of high Tensile Modulus when measured according to ISO 527:

The heterophasic polypropylene composition of the present invention has a Tensile Modulus of at least 1200 MPa or higher, such as 1300 MPa or higher, preferably 1340 MPa or higher, such as at least 1400 MPa or 1450 MPa or higher.

The heterophasic polypropylene composition of the present invention has also good impact behaviour in the sense of high notched impact strength NIS+23 when measured according to ISO179/1aA at +23° C.:

The heterophasic polypropylene composition of the present invention has NIS+23 of at least 5.0 kJ/m$^2$, such as at least 5.5 kJ/m$^2$, or at least 6.2 kJ/m$^2$ or more.

The heterophasic polypropylene composition of the present invention is further characterised by low haze values when measured on 1 mm plaques of 25% or below, such as 23.0% or lower, like 20.0% or lower, such as 18.0% or below.

The heterophasic polypropylene composition of the present invention is further characterised by good stiffness and good impact or optical behaviour:

Accordingly the heterophasic polypropylene composition of the present invention preferably has a tensile modulus of at least 1200 MPa and NIS+23 of at least 5.0 kJ/m$^2$.

Alternatively the heterophasic polypropylene composition of the present invention preferably has a tensile modulus of at least 1200 MPa and haze (1 mm) of at most 25%.

The heterophasic polypropylene composition of the present invention is further characterised by having good stiffness good impact or optical behaviour, which can be summarized under Optomechanical ability (OMA).

The heterophasic polypropylene composition of the present invention may have an OMA-value of at least 300 [(MPa*kJ)/(%*m$^2$)], like at least 360 [(MPa*kJ)/(%*m$^2$)], such as at least 420 [(MPa*kJ)/(%*m$^2$)] or 440 [(MPa*kJ)/(%*m$^2$)] or higher.

Polymerisation and Catalyst

The heterophasic polypropylene composition of the present invention as well as the polypropylene random copolymer (a), polypropylene homopolymer or further polypropylene random copolymer (b) or the ethylene-propylene rubber phase (c) can be produced by any conventional single or multistage polymerisation process. Multistage processes may include also bulk/gas phase reactors known as multizone gas phase reactors.

In preferred embodiment the heterophasic polypropylene composition of the present invention or its polymer components is produced in the presence of an internal donor (ID) being a preferably a non-phthalic compound, preferably a non-phthalic acid ester, still more preferably being a diester of non-phthalic dicarboZxylic acids, such as esters belonging to the group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In similarly preferred embodiment the heterophasic polypropylene composition of the present invention is free of phthalic compounds.

The catalyst for producing the heterophasic polypropylene composition of the present invention or and of the polypropylene random copolymer (a), polypropylene homopolymer or further polypropylene random copolymer (b) or the ethylene-propylene rubber phase (c) can be chosen from any of the known catalyst systems, e.g. metallocene or Ziegler-Natta catalysts.

It is also envisaged within the scope of invention that any of the polymer fractions is produced based on one catalyst technology, and other polymer fractions based on the or another catalyst technology.

However, polymers based on Ziegler-Natta based catalysis are preferred.

A possible catalyst for being used in the production of the nucleated polypropylene composition is described herein:

The catalyst is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a phthalate or preferably a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or $MgCl_2$, but the catalyst is self-supported.

Preferably the internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

Catalyst System

A possible catalyst for being used in the production of the heterophasic polypropylene composition of the present invention is described herein:

The catalyst is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or $MgCl_2$, but the catalyst is self-supported.

The Ziegler-Natta catalyst can be further defined by the way as obtained. Accordingly, the Ziegler-Natta catalyst is preferably obtained by a process comprising the steps of
a)
  $a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or
  $a_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or
  $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; or
  $a_4$) providing a solution of Group 2 alkoxide of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \le n < 2$, $0 \le m < 2$ and $n+m+(2-n-m)=2$, provided that both n and m $\ne 0$, $0 < n' \le 2$ and $0 < m' \le 2$; and
  b) adding said solution from step a) to at least one compound (TC) of a transition metal of Group 4 to 6 and
  c) obtaining the solid catalyst component particles,
and adding an internal electron donor (ID), preferably a non-phthalic internal donor (ID), at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion-solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx), especially the solution of $a_2$).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably C6 to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, most preferably 4.1 to 1:4.

Magnesium alkoxy compound may be a reaction product of alcohol(s), as defined above, and a magnesium compound selected from dialkyl magnesium, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesium are used. Most preferred dialkyl magnesium are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein $R''$ is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesium, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilisers, like surfactants, which are used in a manner known in the art for facilitating the formation of and/or stabilise the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane and or with $TiCl_4$. Washing solutions can also contain donors and/or compounds of Group 13, like trialkyl aluminum, halogenated alky aluminum compounds or alkoxy aluminum compounds. Aluminum compounds can also be added during the catalyst synthesis. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 µm, preferably 10 to 100. Particles are compact with low porosity and have surface area below 20 $g/m^2$, more preferably below 10 $g/m^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 2610270 and EP2610272 which are incorporated here by reference.

The Ziegler-Natta catalyst (ZN-C) is preferably used in association with an alkyl aluminium cocatalyst and optionally external donors.

As further component in the instant polymerisation process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

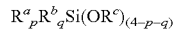

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

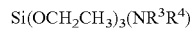

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt. % with respect to the triethyl aluminium (TEAL). More preferably, the hydride content is less than 0.5 wt. %, and most preferably the hydride content is less than 0.1 wt. %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly, the mole ratio of co-catalyst (Co) to external donor (ED) [Co/ED] must be in the range of 5 to 45, preferably is in the range of 5 to 35, more preferably is in the range of 5 to 25; and optionally the mole ratio of co-catalyst (Co) to titanium compound (TC) [Co/TC] must be in the range of above 80 to 500, preferably is in the range of 100 to 350, still more preferably is in the range of 120 to 300.

As mentioned above the Ziegler-Natta catalyst (ZN-C) is preferably modified by the so-called BNT-technology during the above described pre-polymerisation step in order to introduce the polymeric nucleating agent.

Such a polymeric nucleating agent is as described above a vinyl polymer, such as a vinyl polymer derived from monomers of the formula.

CH2=CH—CHR1R2 wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

The polymerisation of the vinyl compound, e.g. VCH, can be done in any inert fluid that does not dissolve the polymer formed (e.g. polyVCH). It is important to make sure that the viscosity of the final catalyst/polymerised vinyl compound/inert fluid mixture is sufficiently high to prevent the catalyst particles from settling during storage and transport.

The adjustment of the viscosity of the mixture can be done either before or after the polymerisation of the vinyl compound. It is, e.g., possible to carry out the polymerisation in a low viscosity oil and after the polymerisation of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerised vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerisation of a vinyl compound should be sufficient to allow for complete reaction of the vinyl monomer, i.e. the polymerisation is continued until the amount of unreacted vinyl compounds in the reaction mixture (including the polymerisation medium and the reactants) is less than 0.5 wt-%, in particular less than 2000 ppm by weight (shown by analysis). Thus, when the prepolymerised catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerisation time of at least 30 minutes is required, preferably the polymerisation time is at least 1 hour and in particular at least 5 hours. Polymerisation times even in the range of 6 to 50 hours can be used. The modification can be done at temperatures of 10 to 70° C., preferably 35 to 65° C.

According to the invention, nucleated high-stiffness propylene polymers are obtained when the modification of the catalyst is carried out in the presence of strongly coordinating external donors.

General conditions for the modification of the catalyst are also disclosed in WO 00/6831, incorporated herein by reference with respect to the modification of the polymerisation catalyst. The preferred embodiments as described previously in the present application with respect to the vinyl compound also apply with respect to the polymerisation catalyst of the present invention and the preferred polypropylene composition in accordance with the present invention. Suitable media for the modification step include, in addition to oils, also aliphatic inert organic solvents with low viscosity, such as pentane and heptane. Furthermore, small amounts of hydrogen can be used during the modification.

Articles

The heterophasic polypropylene composition of the present invention is especially suitable for thin walled articles in packaging, alimentary, medical or diagnostic applications.

The thin-walled articles preferably have a wall thickness of 300 micrometer to 2 mm. More preferably the thin-walled articles have a wall thickness of 300 micrometer to 1400 micrometer, and even more preferably the thin-walled articles have a wall thickness of 300 micrometer to 900 micrometer.

The articles of the current invention can be containers, such as cups, buckets, beakers, trays or parts of such articles, such as see-through-windows, lids, or the like.

The articles made out of the heterophasic polypropylene composition of the present invention can also be caps or closures, like screw caps or hinge caps.

The articles of the current invention are especially suitable for containing food, especially frozen food, such as ice-cream, frozen liquids, sauces, pre-cooked convenience products, and the like.

Articles of the current invention are also suitable for medical or diagnostic purposes, such as syringes, beaker, pipettes, etc The present invention will now be described in further detail by the examples provided below:

Examples

Measuring Methods

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg for polypropylenes and at 190° C. for polyethylenes.

In the case of e.g. sequential polymerisation, when e.g. polymer resin (b) is produced in the presence of a polymer resin (a), the MFR of polymer resin (b) can be calculated applying the formula given here:

$$\log MFR_{final} = w \cdot \log(MFR_a) + (1-w) \cdot \log(MFR_b)$$

Therein $MFR_{final}$ denotes the MFR of the blend consisting of polymer resins (a) and (b), $MFR_a$ denotes the MFR of polymer resin (a), $MFR_b$ denotes the MFR of polymer resin (b), w denotes the relative amount of polymer resins (a) in the resulting blend.

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ ($TCE-d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950). With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}] = 100 * fE$$

The weight percent comonomer incorporation was calculated from the mole fraction:

$$E[\text{wt \%}] = 100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Xylene Soluble Fraction (XCS)

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

XCS %=(100×$m_1$×$v_0$)/($m_0$×$v_1$), wherein $m_0$ designates the initial polymer amount (grams), $m_1$ defines the weight of residue (grams), $v_0$ defines the initial volume (millilitre) and $v_1$ defines the volume of the analysed sample (millilitre).

The fraction insoluble in p-xylene at 25° C. (XCU) is then equal to 100%−XCS %.

Intrinsic Viscosity

The intrinsic viscosity (IV) value increases with the molecular weight of a polymer. The intrinsic viscosity of the XCU and the XCS fraction is measured in decalin at 135° C. according to DIN EN ISO 1628-1 and -3.

DSC Analysis, Melting Temperature (Tm) Crystallization Temperature (Tc)

DSC parameters are measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization (Hc) are determined from the cooling step, while melting temperature and heat of fusion (Hf) are determined from the second heating step.

Tensile Modulus

The Tensile Modulus is ISO 572 on injection moulded specimen Type 1/B (F3/4) prepared in accordance with EN ISO 1873-2.

Haze

Haze and transparency are determined from 1 mm thick injection molded plaque samples according to ASTM D1003-A using a hazegard+hazemeter byk-gardner.

Notched Impact Strength (NIS+23):

The Charpy notched impact strength (NIS+23) was measured according to ISO 179 1eA at +23° C., using injection moulded bar test specimens of 80×10×4 $mm^3$ prepared in accordance with EN ISO 1873-2.

Optomechanical ability (OMA) is understood as the ratio of mechanical (especially impact and Tensile) behaviour, to optical performance, namely haze, wherein the mechanical properties are targeted to be as high as possible and the optical performance is desired to be as low as possible.

The optomechanical ability is determined according the formula given below:

$$OMA = \frac{\text{Tensile Modulus [MPa]} * NIS\left[\frac{kJ}{m^2}\right]}{\text{Haze (1 mm)[\%]}}$$

Material Description

Catalyst 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60 C and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion.

Mixing was continued for 30 minutes at 25° C., after which the reactor temperature was raised to 90° C. within 30 minutes. The reaction mixture was stirred for a further 30 minutes at 90° C. Afterwards stirring was stopped and the reaction mixture was allowed to settle for 15 minutes at 90° C. The solid material was washed 5 times:

Washings were made at 80° C. under stirring for 30 min with 170 rpm. After stirring was stopped the reaction mixture was allowed to settle for 20-30 minutes and followed by siphoning.

Wash 1: Washing was made with a mixture of 100 ml of toluene and 1 ml donor.

Wash 2: Washing was made with a mixture of 30 ml of TiCl4 and 1 ml of donor.

Wash 3: Washing was made with 100 ml of toluene.

Wash 4: Washing was made with 60 ml of heptane.

Wash 5: Washing was made with 60 ml of heptane under 10 minutes stirring.

Afterwards stirring was stopped and the reaction mixture was allowed to settle for 10 minutes while decreasing the temperature to 70° C. with subsequent siphoning, followed by N2 sparging for 20 minutes to yield an air sensitive powder.

Ti content was 3.76 wt-%

For the production of PPR4 the catalyst was modified with VCH as described here:

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt %) was added and after additionally 20 minutes 5.0 g of vinylcyclohexane (VCH) was added). The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

External Donor:

In the Examples, the external donors as disclosed below were used as indicated

D: Dicyclopentyl dimethoxy silane CAS 126990-35-0

All of the materials used are produced on Borstar pilot plant, with a configuration of prepoly reactor, loop, $1^{st}$ gas phase reactor, $2^{nd}$ gas phase reactor (used only in production of c). The details of the polymerisation and analytical data are shown in Table 1.

PPR-1 has a powder MFR of 2.2 g/10 min and C2 2.1 wt %. The MFR was adjusted to 20 g/10 min with an appropriate amount of (tert.butylperoxy)-2,5-dimethylhexane (Trigonox 101, CAS No. 78-63-7, distributed by Akzo Nobel, Netherlands) on a twin screw extruder (ZSK57), with melt temperature of 200-240° C. During the MFR adjustment, 400 ppm calcium Stearate (CAS No. 1592-23-0), 1000 ppm Irganox 1010 supplied by BASF AG, Germany (Pentaerythrityl-tetrakis(3-(3',5'-di-tert.butyl-4-hydroxyphenyl)-propionate, CAS No. 6683-19-8) and 500 ppm of Irgafos 168 supplied by BASF AG Germany (CAS No. 31570-04-4, Tris (2,4-di-t-butyphenyl)phosphite) were also compounded into, in order to pretect the final blend.

PPR-2 and PPR-3 were compounded with 400 ppm calcium Stearate (CAS No. 1592-23-0), 1000 ppm Irganox 1010 supplied by BASF AG, Germany (Pentaerythrityltetrakis(3-(3',5'-di-tert. butyl-4-hydroxyphenyl)-propionate, CAS No. 6683-19-8) and 500 ppm of Irgafos 168 supplied by BASF AG Germany (CAS No. 31570-04-4, Tris (2,4-di-t-butyphenyl)phosphite) on ZSK 57.

PPR4 is a heterophasic polypropylene copolymer having and MFR of 2.0, XCS of 13.7 wt.-%, C2 of XCS) of 25 wt.-% and IV of 1.7 g/dl.

PPR4 comprises both the fraction (b+c) and was compounded with 1250 ppm of HPN 20E (manufactured by Milliken), 400 ppm calcium Stearate (CAS No. 1592-23-0), 1000 ppm Irganox 1010 supplied by BASF AG, Germany (Pentaerythrityl-tetrakis(3-(3',5'-di-tert. butyl-4-hydroxyphenyl)-propionate, CAS No. 6683-19-8) and 500 ppm of Irgafos 168 supplied by BASF AG Germany (CAS No. 31570-04-4, Tris (2,4-di-t-butyphenyl)phosphite) on ZSK 57.

IE1-3 were prepared by compounding desired amount of PPR-1 (after MFR adjustment), PP(b+c) and 2000 ppm of Millad 3988 (CAS No. 13586-56-2, supplied by Milliken) on twin screw extruder (ZSK 18)

IE 4 and IE5 were prepared by compounding desired amount of PPR-2 or 3 and PP(b+c) and 2000 ppm of Millad 3988 (CAS No. 13586-56-2, supplied by Milliken) on twin screw extruder (ZSK 18)

Details of recipe is shown in Table 2 and 3.

CE1 is RF365MO, which is a polypropylene-ethylene random copolymer provided by Borealis having a MFR230/2.16 of 20 g/10 min and an ethylene content of 3.1 wt.-%.

CE2 is RE420MO, which is a polypropylene-ethylene random copolymer provided by Borealis having a MFR230/2.16 of 13 g/10 min and an ethylene content of 3.7 wt.-%.

CE3 is BF330MO, which is a heterophasic polypropylene-ethylene copolymer provided by Borealis having a MFR230/2.16 of 18 g/10 min and an ethylene content of 8 wt.-%

CE4 is SG930MO, which is an impact-modified polypropylene random copolymer having an MFR230/2.16 of 25 g/10 min and an ethylene content of 24 wt.-%.

TABLE 1

Basis polymers for the heterophasic polypropylene composition of the present invention

|  |  | PPR-1 | PPR-2 | PPR-3 | PPR-4 |
|---|---|---|---|---|---|
| Nucleation |  | None | None | None | Polymeric nucl. agent |
| Prepolymerisation |  |  |  |  |  |
| Temperature | ° C. | 29 | 29 | 29 | 30 |
| Catalyst feed | g/h | 4.2 | 3.8 | 4.9 | 2.9 |
| Donor type | n.a. | D | D | D | D |
| Donor | g/tC3 | 40.7 | 40.7 | 40.7 | 46 |
| TEAL | g/tC3 | 170 | 170.0 | 170.0 | 180 |
| Loop |  |  |  |  |  |
| Temperature | ° C. | 70 | 70 | 70 | 80 |
| H2/C3 | mol/kmol | 0.8 | 2.4 | 1.8 | 0.45 |
| C2/C3 | mol/kmol | 5.0 | 2.7 | 1.6 | 0 |
| Polymer Split | wt % | 45 | 38.0 | 50.0 | 41 |
| MFR2 | g/10 min | 2.7 | 34.5 | 20.5 | 2.6 |
| C2 total | wt % | 2.3 | 1.8 | 0.6 | 0 |
| XCS | wt % | 6.7 | 6.1 | 3.7 | 1.4 |
| 1st GPR |  |  |  |  |  |
| Temperature | ° C. | 80 | 80 | 80 | 85 |
| H2/C3 | mol/kmol | 6.4 | 49.7 | 43.4 | 6 |
| C2/C3 | mol/kmol | 11.6 | 18.1 | 35.6 | 0 |
| Polymer Split | wt % | 56 | 62.0 | 50.0 | 47 |
| 2$^{nd}$ GPR |  |  |  |  |  |
| Temperature | ° C. | Not in use | Not in use | Not in use | 70 |
| H2/C3 | mol/kmol | Not in use | Not in use | Not in use | 442 |
| C2/C3 | mol/kmol | Not in use | Not in use | Not in use | 192 |
| Polymer Split | wt % | Not in use | Not in use | Not in use | 12 |
| Mixer |  |  |  |  |  |
| MFR2 | g/10 min | 2.2 | 26 | 24 | 2.5 |
| C2 total | wt % | 2.1 | 1.90 | 2.70 | 4.6 |
| XCS | wt % | 5.6 | 5.20 | 7.70 | 13.7 |
| C2 (XCS) | Wt % | n.m. | n.m. | n.m. | 25 |
| IV (XCS) | Dl/g | n.m. | n.m. | n.m. | 1.7 |

TABLE 2

Mechancal properties of the heterophasic polypropylene compositions based on visbroken polypropylene random copolymer (a)

|  |  | IE1 | IE2 | IE3 | CE1/ | CE2/ | CE3/ | SG930 |
|---|---|---|---|---|---|---|---|---|
| PPR1 | wt % | 95 | 90 | 85 |  |  |  |  |
| PPR-4 (b + c) | wt % | 5 | 10 | 15 |  |  |  |  |
| Millad 3988 | wt % | 0.2 | 0.2 | 0.2 |  |  |  |  |
| C2-of PP-random (a) | wt % | 2.1 | 1.90 | 2.70 | 3.1 | 3.7 | 8 | 24 |
| MFR | g/10 min | 18 | 18 | 16 | 20 | 13 | 18 | 25 |
| C2 total of final comp |  | 2.2 | 2.4 | 2.5 |  |  |  |  |
| Tm | ° C. | 156 | 158 | 159 | 151 | 150 | 164 |  |
| XCS | wt % | 5 | 5.5 | 6 | 6.8 | 5.8 | 12.5 | 16 |
| Tensile Modulus | MPa | 1376 | 1414 | 1423 | 1138 | 921 | 1300 | 100 |
| Elongation at break | % | 166 | 146 | 140 | 588 | 372 | 125 | 400 |
| Charpy + 23° C. | kJ/m2 | 5.84 | 6.1 | 6.5 | 4.5 | 5.3 | 6.3 | 7.6 |
| Haze (1 mm) | % | 17 | 19 | 18 | 20 | 23 | 98 | 41 |
| OMA (1 mm) |  | 473 | 454 | 514 | 256 | 212 | 84 | 19 |

TABLE 3

Heterophasic polypropylene composition based on in-situ polypropylene random copolymer.

| Matrix | Unit | IE4 PPR-2 | IE5 PPR-3 |
|---|---|---|---|
| PPR4 (b + c) | | 8% | 15% |
| MFR-final | g/10 min | 23 | 18 |
| C2 total | wt % | 2.1 | 3.0 |
| XCS | wt % | 6.16 | 8.75 |
| C6 FDA | wt % | | |
| Tc | ° C. | 125 | 129 |
| Tm1 | ° C. | 157 | 162 |
| Hm1 | J/g | 99 | 93 |
| Tensile modulus/1B | MPa | 1517 | 1352 |
| Tensile strength | MPa | 35 | 32 |
| Elongation at break | % | 123 | 120 |
| NIS-B | kJ/m2 | 5.8 | 7.5 |
| Haze-1 mm | % | 18 | 23 |
| OMA (1 mm) | | 489 | 441 |

As can be seen from the values in the table above, the inventive examples show clear advantages in view of mechanical and optical properties. They have improved stiffness, impact and optical properties. The inventive examples can be produced in a simplified way, as less base materials are needed.

All the polymers showed good processability when injection moulded into articles having a wall thickness of 1 mm.

The invention claimed is:

1. A heterophasic polypropylene composition comprising:
   a) 80.0-96.0 wt.-% of a polypropylene random copolymer;
   b) 3.0-18.0 wt.-% of a polypropylene homopolymer or polypropylene random copolymer;
   c) 0.5-2.50 wt.-% of an elastomeric ethylene-propylene copolymer fraction characterised by an IV of 0.7-2.0 dl/g and an C2(XCS) of 12.0-35.0 wt.-%.; and
   d) 0.002-0.60 wt.-% of a nucleating or clarifying agent;
   wherein the heterophasic polypropylene composition has an MFR230/2.16 according to ISO1133 of 10.0 g/10 min or more.

2. The heterophasic polypropylene composition according to claim 1, wherein the polypropylene homopolymer or polypropylene random copolymer b) and the elastomeric ethylene-propylene copolymer fraction c) are present in in a ratio of from 60:40 (b:c) to 90:10 (b:c).

3. The heterophasic polypropylene composition according to claim 1, wherein the heterophasic polypropylene composition comprises a polypropylene random copolymer as b) and the polypropylene random copolymer a) differs from the polypropylene random copolymer b) in view of comonomer content and/or MFR230/2.16.

4. The heterophasic polypropylene composition according to claim 1, wherein
   the polypropylene random copolymer (a) comprises ethylene as a comonomer and has an ethylene content of 0.2 to 3.5 wt.-%; and/or
   the polypropylene homopolymer or polypropylene random copolymer (b) is a polypropylene random copolymer comprising ethylene as a comonomer and has an ethylene content of 0-1.0 wt.-%.

5. The heterophasic polypropylene composition according to claim 1, wherein
   the polypropylene random copolymer a) has an MFR230/2.16 according to ISO1133 of ≥8.0 g/10 min, and the polypropylene homopolymer or polypropylene random copolymer b) has an MFR230/2.16 according to ISO1133 of at most 8.0 g/10 min.

6. The heterophasic polypropylene composition according to claim 1, wherein the sum of the weight fractions of the polypropylene homopolymer or polypropylene random copolymer (b) and the elastomeric ethylene-propylene copolymer fraction (c) together form at most 20.0 wt.-% based on the weight of the heterophasic polypropylene composition.

7. The heterophasic polypropylene composition according to claim 1, wherein the nucleating or clarifying agent (d) is a soluble nucleating or clarifying agent.

8. The heterophasic polypropylene composition according to claim 1, wherein the heterophasic polypropylene composition comprises at least two nucleating or clarifying agents.

9. The heterophasic polypropylene composition according to claim 1, wherein the nucleating or clarifying agent comprises a polymeric nucleating agent.

10. The heterophasic polypropylene composition according to claim 1, wherein the heterophasic polypropylene composition has having a Tensile Modulus measured according to ISO527 of at least 1200 MPa, a notched impact strength measured according to ISO179/1eA+23° C. of at least 5.0 kJ/m$^2$, and a Haze value measured according to ASTM 1003D on a 1 mm injection moulded plaque of at most 25.0%.

11. The heterophasic polypropylene composition according to claim 1, wherein the heterophasic polypropylene composition has an optomechanical ability (OMA) of at least 300, as determined according to formula:

$$OMA = \frac{\text{Tensile Modulus [MPa]} * NIS\left[\frac{kJ}{m^2}\right]}{\text{Haze (1 mm)}[\%]}$$

wherein
Tensile Modulus [MPa] is the tensile modulus in MPa;

$NIS\left[\frac{kJ}{m^2}\right]$ is notched impact strength in kJ/m$^2$; and
Haze (1 mm) [%] is the Haze value according to ASTM 1003D on a 1 mm injection moulded plaque in %.

12. The heterophasic polypropylene composition according to claim 1, the heterophasic polypropylene composition being polymerised in the presence of a Ziegler-Natta catalyst, wherein the Ziegler Natta catalyst comprises
   a compound of a transition metal of IUPAC Group 4 to 6,
   a Group 2 metal compound,
   an internal donor, wherein said internal donor is a non-phthalic compound, and
   a co-catalyst.

13. The heterophasic polypropylene composition according to claim 12, wherein the internal donor is selected from the group consisting of (di)esters of non-phthalic carboxylic (di)acids, 1,3-diethers, derivatives thereof, and mixtures thereof.

14. The heterophasic polypropylene composition according to claim 1, wherein the heterophasic polypropylene composition is free of phthalic acid esters as well as their respective decomposition products.

15. A moulded article comprising the heterophasic polypropylene composition of claim 1.

16. A method of use of the heterophasic polypropylene composition according to claim 1, the method comprising using the heterophasic polypropylene in a packaging application.

17. The heterophasic polypropylene composition according to claim 12, wherein the internal donor is a non-phthalic acid ester.

18. The heterophasic polypropylene composition according to claim 12, wherein the Ziegler Natta catalyst further comprises an external donor.

* * * * *